(12) United States Patent
Gworek

(10) Patent No.: US 8,781,878 B2
(45) Date of Patent: *Jul. 15, 2014

(54) COMPUTER METHOD AND APPARATUS FOR OUTCOME-BASED PRICING OF GOODS AND SERVICES

(76) Inventor: Jonathan D. Gworek, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,695

(22) Filed: Aug. 17, 2012

(65) Prior Publication Data

US 2013/0041698 A1 Feb. 14, 2013

Related U.S. Application Data

(63) Continuation of application No. 12/935,240, filed as application No. PCT/US2009/038377 on Mar. 26, 2009, now Pat. No. 8,249,916.

(60) Provisional application No. 61/072,325, filed on Mar. 28, 2008.

(51) Int. Cl.
  G06Q 10/00 (2012.01)
  G06Q 30/06 (2012.01)
  G06Q 30/02 (2012.01)

(52) U.S. Cl.
  CPC ............ *G06Q 30/02* (2013.01); *G06Q 30/0603* (2013.01); *G06Q 30/0283* (2013.01)
  USPC ..... 705/7.35; 705/1.1; 705/14.17; 705/14.23; 705/26.1

(58) Field of Classification Search
  None
  See application file for complete search history.

(56) References Cited

U.S. PATENT DOCUMENTS

| 6,480,861 | B1 | 11/2002 | Kanevsky et al. |
| 2003/0055727 | A1 | 3/2003 | Walker et al. |
| 2003/0200104 | A1 | 10/2003 | Heming et al. |
| 2005/0102190 | A1 | 5/2005 | Thiam |
| 2006/0041500 | A1* | 2/2006 | Diana et al. ..................... 705/37 |
| 2006/0100009 | A1 | 5/2006 | Walker et al. |
| 2007/0118455 | A1 | 5/2007 | Albert et al. |

(Continued)

OTHER PUBLICATIONS

Fort, Rodney, Inelastic Sports Pricing, 2004, Managerial and Decision Economics, 25, pp. 87-94.

(Continued)

*Primary Examiner* — John Hayes
*Assistant Examiner* — Tonya Joseph
(74) *Attorney, Agent, or Firm* — Morse, Barnes-Brown & Pendleton, P.C.; Sean D. Detweiler, Esq.

(57) ABSTRACT

The present invention provides a system and method that allow sellers to offer goods and services at prices that vary depending on what transpires during the event or service. The final price is determined after the event or service based on the occurrence of certain pre-selected attributes. Candidate attributes are potentially associated with the event or service but the outcome or occurrence of the attribute is not knowable by the buyer and seller with certainty at the time of the original purchase. Using the outcome-based pricing (OBP) and settlement system the seller can set prices to minimize significant deviation from a pre-determined revenue plan, or alternatively build-in an increase or even decrease in gross revenues. The present invention allows for the order, payment and final settlement of the purchase transaction, automatically. The preferred embodiment for the OBP pricing and settlement system is via a computer network that includes the Internet.

24 Claims, 14 Drawing Sheets

Final OBP Price and Settlement Database 253

| OBP Tracking No. 530 | Buyer Identifier 535 | Seller Identifier 540 | Date Identifier 545 | Seat Identifier 550 | Selected Attribute 555 | Price Paid at Purchase 560 | Low Price 565 | High Price 570 | Game Status 575 | Selected Attribute Outcome 580 | Settlement Amount Owed by Buyer 585 | Status 590 |
|---|---|---|---|---|---|---|---|---|---|---|---|---|
| 10 | B1 | 53 | 7/3/08 | G6 | Orioles Win | 40 | 40 | 60 | Closed | Negative | 0 | Closed |
| 17 | B2 | 54 | 6/30/08 | P2 | Dodgers Win | 70 | 70 | 90 | Closed | Positive | +20 | Closed |
| 9 | B3 | 51 | 5/15/08 | Q5 | Red Sox Win | 25 | 25 | 40 | Closed | Positive | +15 | Closed |
| 13 | B4 | 52 | 9/4/08 | B7 | Yankees Win | 30 | 30 | 45 | Open | N/A | N/A | Open |

(56) References Cited

U.S. PATENT DOCUMENTS

| | | |
|---|---|---|
| 2007/0150387 A1 | 6/2007 | Seubert et al. |
| 2007/0214057 A1 | 9/2007 | Lee et al. |
| 2007/0244766 A1 | 10/2007 | Goel |
| 2008/0243532 A1 | 10/2008 | Leach et al. |
| 2009/0128335 A1 | 5/2009 | Leung |
| 2010/0094722 A1 | 4/2010 | Cella et al. |
| 2011/0029458 A1 | 2/2011 | Gworek |
| 2011/0145024 A1 | 6/2011 | Adamsky et al. |

OTHER PUBLICATIONS

International Search Report for International Application No. PCT/US09/38377, dated May 15, 2009.

International Preliminary Report on Patentability for International Application PCT/US09/38377, dated Sep. 28, 2010.

Notice of Allowance for U.S. Appl. No. 12/935,240, dated Mar. 9, 2010.

\* cited by examiner

| Seller Database 251 | | | |
|---|---|---|---|
| Seller Identifier 330 | Seller Name 340 | Seller Account Number 350 | [Other] 360 |
| S1 | Red Sox | 1 | |
| S2 | Yankees | 2 | |
| S3 | Orioles | 3 | |
| S4 | Dodger | 4 | |

305 → (row S1)
310 → (row S2)
315 → (row S3)
320 → (row S4)

Buyer Database 252 400

| Buyer Identifier 430 | Buyer Name 440 | Buyer Address 450 | Buyer Credit Card Number 460 |
|---|---|---|---|
| B1 | Smith | Main St. | 625 |
| B2 | Jones | Front St. | 723 |
| B3 | Conley | Rear St. | 641 |
| B4 | Boig | River St. | 982 |

Final OBP Price and Settlement Database 253

500

| OBP Tracking No. 530 | Buyer Identifier 535 | Seller Identifier 540 | Date Identifier 545 | Seat Identifier 550 | Selected Attribute 555 | Price Paid at Purchase 560 | Low Price 565 | High Price 570 | Game Status 575 | Selected Attribute Outcome 580 | Settlement Amount Owed by Buyer 585 | Status 590 |
|---|---|---|---|---|---|---|---|---|---|---|---|---|
| 10 | B1 | 53 | 7/3/08 | G6 | Orioles Win | 40 | 40 | 60 | Closed | Negative | 0 | Closed |
| 17 | B2 | 54 | 6/30/08 | P2 | Dodgers Win | 70 | 70 | 90 | Closed | Positive | +20 | Closed |
| 9 | B3 | 51 | 5/15/08 | Q5 | Red Sox Win | 25 | 25 | 40 | Closed | Positive | +15 | Closed |
| 13 | B4 | 52 | 9/4/08 | B7 | Yankees Win | 30 | 30 | 45 | Open | N/A | N/A | Open |

| Game Date 630 | Win 640 | Shutout 650 | No-Hit 660 | David Ortiz Plays 670 |
|---|---|---|---|---|
| 7/3/08 | Yes | Yes | Yes | Yes |
| 7/4/08 | Yes | No | Yes | No |
| 7/5/08 | Yes | No | No | No |
| 7/7/08 | Yes | No | No | No |
| 7/9/08 | Yes | No | No | Yes |

FIG. 6

| Game Date 730 | Win 740 | Shutout 750 | No-Hit 760 | David Ortiz Plays 770 |
|---|---|---|---|---|
| 7/3/08 | .75 | .05 | .0001 | .95 |
| 7/14/08 | .65 | .04 | .0001 | .95 |
| 7/15/08 | .65 | .04 | .0025 | .95 |
| 7/17/08 | .65 | .04 | .0002 | .95 |
| 7/9/08 | .50 | .025 | .0001 | .95 |

Statistical Database 255

FIG. 7

| Seller 830 | Base Rule 840 | Discount/ Premium 1 850 | Discount/ Premium 2 860 |
|---|---|---|---|
| S1 | Zero Sum | P+D = $20 | P+D= $30 |
| S2 | Plus $5.00 | P+D= $30 | NA |
| S3 | Plus $2.00 | P+D= $10 | P+D= $50 |
| S4 | Zero Sum | Premium = $15 | Premium = $20 |

Seller Rules Database 256

FIG. 8

Seller Available Inventory and Standard Price Database 257

| Game Date 930 | Seat 940 | Standard Price 950 |
|---|---|---|
| 7/3/08 | G6 | $50 |
| 7/14/08 | P2 | $80 |
| 7/5/08 | Q5 | $30 |
| 7/7/08 | B7 | $35 |
| 7/9/08 | Z4 | $50 |

| Game Date 1030 | Win 1040 | Shutout 1050 | No-Hit 1060 | David Ortiz Plays 1070 |
|---|---|---|---|---|
| 7/3/08 | Negative | Negative | Negative | Negative |
| 7/4/08 | Positive | Negative | Positive | Positive |
| 7/5/08 | Positive | Negative | Positive | Positive |
| 7/7/08 | Open | Open | Open | Open |
| 7/9/08 | Open | Open | Open | Open |

SELECTED ATTRIBUTE OUTCOME DATABASE 258

Fig. 10

Offer Price Database 259

| OBP Tracking Number 1120 | Low 1 1130 | High 1 1140 | Low 2 1150 | High 2 1160 |
|---|---|---|---|---|
| 85 | $40 | $50 | $30 | $60 |
| 97 | $20 | $40 | $10 | $50 |
| 110 | $75 | $125 | NA | NA |

1105 → row 1
1110 → row 2
1115 → row 3

Fig.11

COMPUTER METHOD AND APPARATUS FOR OUTCOME-BASED PRICING OF GOODS AND SERVICES

CROSS-REFERENCE TO RELATED APPLICATIONS

This application is a continuation of U.S. application Ser. No. 12/935,240, filed Sep. 28, 2010 now U.S. Pat. No. 8,249,916, which is a national stage filing under 35 U.S.C. 371 of International Application PCT/US2009/038377, filed Mar. 26, 2009, which claims the benefit of U.S. Provisional Application No. 61/072,325, filed Mar. 28, 2008, the entire teaching of which are incorporated herein by reference. International Application PCT/US2009/038377 was publishedunder PCT Article 21(2) in English.

BACKGROUND OF THE INVENTION

It is common business practice for event promoters and ticket distributors, as well as airlines and other service for providers, to offer tickets for sale in person at ticket offices, over the phone or via the Internet. When buying tickets online, a purchaser reviews the available inventory and prices of tickets offered for sale, and after deciding what tickets to purchase, places an order via the Internet using well established, online purchasing procedures.

Ticket prices for events are typically established by the promoter or distributor and available seats for specific events are offered for sale at specified prices. Basic supply and demand forces determine what ticket prices the market will bear, with purchasers willing to pay more for tickets that are generally considered to be more desirable based on a variety of attributes. For example, for entertainment events such as sporting events, typically ticket prices of seats for a given event vary based on the physical proximity of the seats to the location of the performers within the venue such that seats close to the field or the stage and offering the best viewing vantage point cost more than seats further away from the field or stage and offering a less desirable viewing vantage point. Certain other variables might also determine the pricing of the seats, such as whether the seats come with in-seat service, parking and other perquisites and amenities. For certain types of events, the price of tickets also often vary depending on the date and time of the showing, with tickets for high demand times priced higher than tickets for low demand times. The provision of certain services, such as airline flights, are also priced based on a combination of attributes associated with the selected seat.

Inherent in the standard ticket pricing model is the fact that ticket prices for a given seat at a specific event, and the price for certain services, once set by the seller, are static, and will not vary regardless of their utility, or actual value that a particular purchaser derives from the event. The static setup of ticket pricing does not allow for a person who gets more use and enjoyment out of attendance at an event based on what happens during the event to pay more than the standard price. Neither does it allow a person who gets less use or enjoyment out of attendance at an event based on what happens during the event to pay less than the standard price. Similarly, as it relates to the provision of certain services such as airline transportation, the buyer pays an agreed upon price regardless of the quality of the service. Alternatively stated, the current pricing method does not allow a seller of tickets, or the provider of services, to charge more for an event or service that delivers a high level of value to a purchaser, nor does it allow a seller to charge less for an event or service that is disappointing to the buyer.

SUMMARY OF THE INVENTION

Most people who have attended sporting events have experienced both the thrill of victory and the frustration of defeat, the excitement of a suspenseful game and the boredom of a lopsided victory, and the range of other emotions that are inherent in the fan experience. Yet, while the value of a game to a fan can vary considerably from one game to the next, the ticket price of a particular seat in a given stadium is generally the same from game to game irrespective of the fan experience. As a result, a fan can come away from a game one day feeling like the purchase of a seat was money well spent, and another day pay the identical price for the identical seat but come away feeling like he overpaid. Similarly, from the seller's perspective, the seller charges the same price for an event regardless of the value realized by the purchaser. In short, the pricing of tickets from both the purchaser's and the seller's perspective is highly inefficient. The price is the same regardless of the elasticity of demand for the product as delivered. The same can be said of purchases for a variety of entertainment events, as well as the provision of certain types of services.

Events such as baseball games, and the provision of certain services such as airline flights, are each characterized by a wide range of attributes. Certain attributes in particular, either individually or bundled together, are of high value from the buyer's perspective. However, the value of any specific attribute may well vary from buyer to buyer. As such, if the seller were able to guaranty to the buyer certain attributes at the time of the sale, the seller would in theory be able to charge a higher price per unit without sacrificing the volume because the elasticity of demand for a high value product is lower. Of course, in many cases the occurrence of certain attributes can not be predicted or guaranteed at the time of sale. Rather, only after the event is over, or a service is performed, will the parties have knowledge of which attributes describe the event or service as performed. For example, when a ticket to a baseball game is purchased, neither the buyer nor seller know with certainty which team will win. Similarly, when a ticket is sold for an airline seat, neither the buyer nor the seller know whether the flight for which the seat was purchased will leave on time. These attributes, a win or an on-time flight, are not perceivable until after the event occurs or service is performed.

The present invention allows sellers of goods, including tickets to a variety of event performances, and services, to set prices based on the attributes that have undefined or unknown outcome (occurrence) when the purchase is made. Through this pricing methodology, the ultimate price paid by the buyer more closely reflects the value realized by the buyer, and the payment received by the seller more closely reflects the value delivered by the seller. While it has application in offline sales as well, the current invention is best suited to the purchases made over the Internet.

The following description illustrates non-limiting example embodiments and features that may be incorporated into a system for pricing and selling goods, including tickets to certain events, and services such that the final price charged to the buyer is determined, and finally settled, after the occurrence of the event or the provision of the service, where the term "system" may be interpreted as a system, a subsystem, apparatus, device, method, computer based or other based, or any combination thereof.

A method or corresponding apparatus in an example embodiment of the present invention relates to pricing and selling goods, including tickets to certain events, and services such that the final price charged to the buyer is determined, and finally settled, after the occurrence of the event or the provision of the service. The price is based on whether a pre-selected attribute potentially characteristic of such event or service occurs during the event or service. The invention system may provide at least one client computer connected to a computer network under control of a client system and display via a graphical user interface a variety of goods, including tickets to events, or services, from which the user of the client computer or buyer may select. In response to the buyer selection, the invention system may request from a server system the availability of a specifically selected good, including a ticket to an event for a specific seat, or service, and display information on the buyer's computer identifying availability of the selected unit of good or service. In response to the buyer selecting a specific good or service, the invention system may request from a server system database a standard price for such unit and display the standard price and an option for the buyer to select from a second pricing option, namely an outcome based pricing on the buyer's computer.

The outcome based price depends on the occurrence of a specific, pre-selected attribute potentially characteristic of the unit. The invention system may request from the buyer to select either the standard price option or the outcome-based pricing option. Other permutations of these options may be presented. In response to the buyer selecting outcome-based pricing, the invention system may request from the server system a list of attributes to select from, attributes potentially characteristic of such event or service from which the buyer may select. The invention system may display one or more of these selectable attributes and request that the buyer selects one selectable attribute. The invention system may receive a response from the buyer and in response to the buyer selecting a specific selectable attribute, request from a server system two prices for the unit, including a low price and a high price and present the two prices to the buyer. The low price is arranged to correspond to a negative occurrence, the price if such selected attribute does not occur. The high price is arranged to correspond to a positive occurrence, the price if the selected attribute does occur. The invention system may receive from the server system the high price and low price, display on the buyer's computer the high price and low price, and request that the buyer agree to pay upon placing the order for the unit either (i) the high price, (ii) the low price, (iii) no payment initially with full settlement to be made after the event is over or service rendered and the final price known, or (iv) the standard price.

The invention system may receive the order and in response to the order notify the buyer of the terms for settlement of the purchase, and requesting that the buyer confirm his or her acceptance of the terms of settlement. The invention system may receive the confirmation, generate an order to purchase the requested unit from the buyer on the agreed upon settlement terms, fulfill the generated order to complete the purchase and charge the buyer's credit or debit card or accept other form of payment, and deliver an online receipt to the buyer. In the event the buyer selects outcome-based pricing, after the completion of the event or service, the invention system may request from the server system a notification as to the whether the selected attribute in fact occurred and receive the notification. The invention system may request from the server system the final price based on the occurrence of such attribute, receive the response with the final price, request the final settlement amount from the server system and initiate a credit or debit to the user's credit card account or some other form of settlement.

The invention system may fix both the premium over the standard price reflected in the high price and the discount under the standard price represented by a low price by the seller. The invention system may fix multiple values for the premium and discount representing different spreads between the high price and the low price resulting in multiple pricing options to the buyer by the seller. The high price and low price may be determined by, in the former case adding the premium to the standard price, and in the latter case, subtracting the discount from the standard price.

The invention system may determine the premium and the discount based on a formula or formulae established by the seller defining the mathematical relationship between the standard price, the premium and the discount. The formula or formulae may incorporate statistical probabilities for both the positive occurrence and negative occurrence by calling such statistics from a server system database so that the seller can establish the high price and low price such that the expected deviation from the standard price over a statistically significant sample set can be controlled by the seller.

The seller may fix the value for the discount, resulting in the premium being solved for automatically using the formula or formulae, and determine the high price and the low price. The invention system may determine the high price by adding the premium to the standard price. The invention system may determine the low price by subtracting the discount from the standard price. The seller may fix the value for the premium, resulting in the discount being solved for automatically using the formula or formulae and the high price and low price being determined by, in the former case adding the premium to the standard price, and in the latter case, subtracting the discount from the standard price. The seller may fix multiple values for the discount resulting in multiple spreads corresponding to the difference between the high price and low price resulting in multiple pricing options to the buyer. The seller may fix multiple values for the premium resulting in multiple spreads corresponding to the difference between the high price and the low price resulting in multiple pricing options to the buyer.

The buyer may fix the value for the discount as a result of which the premium is automatically solved for using a formula or formulae and the high price and low price are determined by, in the former case adding the premium to the standard price, and in the latter case, subtracting the discount from the standard price. The buyer may fix the value for the premium as a result of which the discount is solved for automatically using the formula or formulae and the high price and low price are determined, by, in the former case adding the premium to the standard price, and in the latter case, subtracting the discount from the standard price. The buyer may fix multiple values for the discount resulting in multiple spreads corresponding to the difference between the high price and low price resulting in multiple pricing options to the buyer. The buyer may fix multiple values for the premium resulting in multiple spreads corresponding to the difference between the high price and the low price resulting in multiple pricing options to the buyer. The buyer may identify a selectable attribute other than from the list provided by the seller. The buyer may simultaneously select multiple selectable attributes.

The selected attribute may be of such a nature that it can be controlled by the seller or performer of the goods or services, and the seller may be provided with data prior to the event or service about the aggregate of the premiums that the seller may realize based on the positive occurrence of the controllable selected attributes whose information is used to inform the seller's performance decisions.

The client system and the server system may communicate via the Internet.

Additionally, an example embodiment of the present invention relates to pricing and selling goods, including tickets to certain events, and services, in which the final price charged to the buyer may be determined, and finally settled, after the occurrence of the event or the provision of the service. The price is based on whether one or more pre-selected attributes potentially characteristic of such event or service occurs during the event or service. The invention system, under control of a server system, may provide at least one server connected to a computer network, receive a request from a client computer for a list of goods, including tickets to events, or services, respond to such request by providing such list, receive a request from a client computer for the availability of a unit, and respond to such request by providing the availability of such unit. The invention system may receive a request from the client computer for the standard price of such unit, respond to such request by providing the standard price, receive a request from the client computer for a list of one or more selectable attributes, respond to such request by providing a list of selectable attributes, receive a request from the client computer for the high price and low price associated with a selected attribute, and execute a subroutine in order to calculate the high price and low price.

The invention system may call from a database the formula or formulae to be used in the calculation, call from a database the statistical probability for the selected attribute, call from a database the standard price, and/or call from a database any other constants or mathematical relationships comprising the rule established by the seller. Other computer processing configurations are suitable. The invention system may perform the calculation of the premium and discount by solving the formula or formulae, calculate the high price and low price by, in the former case adding the premium to the standard price, and in the latter case, subtracting the discount from the standard price, store on the server in the data record with respect to the high price and low price as calculated, respond to such request by providing the buyer with a high price and low price, and receive a request from the client computer to purchase the unit by agreeing to pay at the time of the purchase either (i) the high price, (ii) the low price, (iii) no payment initially with full settlement to be made after the event is over or service rendered and the final price known, or (iv) the standard price.

The invention system may respond to such request by notifying the buyer of the terms for settlement of the purchase, and request that the buyer confirm his or her acceptance of the terms of settlement, receive the confirmation from the client computer, receive a request from the client computer for a purchase order, respond to such request by providing a purchase order, receive from the client system a purchase order, execute a subroutine in order to settle the initial order and store the information necessary for final settlement of the transaction. The invention system may respond to the purchase order by initiating a charge to the buyer's credit or debit card through a credit card processor or accept other form of payment, and initiate the fulfillment of the order and delivery of the ticket or confirmation of the order.

The invention system may receive from the client computer a request for a receipt confirming the purchase of the ticket, respond to the request for a receipt by sending an online receipt to the client computer, request from the client computer data with respect to the purchase, including the name of the buyer, the buyer's credit card information, the price paid by the buyer and the unit purchased, and store on a server in a data record specific identifying information and detail with respect to such purchase.

In the event the buyer selects option-based pricing, after the completion of the event or service, the invention system may execute a subroutine to monitor a data record for the status of the event or service for which the purchase was made, call from a data record the outcome of the selected attribute upon completion of the event or service, call from a data record the final settlement amount and settlement instructions, initiate a credit or debit to the user's credit card or some other form of final settlement, and store on a server data the final settlement terms and status.

The invention system may fix both the premium and the discount. The invention system may fix multiple values for the premium and discount representing different spreads resulting in multiple pricing options to the buyer. The invention system may determine the high price and low price by, in the former case adding the premium to the standard price, and in the latter case, subtracting the discount from the standard price.

The invention system may determine the premium and the discount based on a formula or formulae established by the seller, formula or formulae defining the mathematical relationship between the standard price, the premium and the discount. The formula may incorporate statistical probabilities for both the positive occurrence and negative occurrence by calling such statistics from a database so that the seller can establish the high price and low price such that the expected deviation from the standard price over a statistically significant sample set can be controlled by the seller.

The seller may fix the value for the discount as a result of which the premium is solved for automatically using the formula or formulae. The invention system may determine the high price and low price by, in the former case adding the premium to the standard price, and in the latter case, subtracting the discount from the standard price. The seller may fix the value for the premium as a result of which the discount is solved for automatically using the formula or formulae. The invention system may determine the high price and low price by, in the former case adding the premium to the standard price, and in the latter case, subtracting the discount from the standard price. The seller may fix multiple values for the discount resulting in multiple spreads corresponding to the difference between the high price and low price which the seller than presents as multiple pricing options to the buyer. The seller may fix multiple values for the premium resulting in multiple spreads resulting in multiple pricing options to the buyer.

The buyer may fix the value for the discount as a result of which the premium is solved for automatically using the formula or formulae. The invention system may determine the high price and low price by, in the former case adding the premium to the standard price, and in the latter case, subtracting the discount from the standard price. The buyer may fix the value for the premium as a result of which the discount is solved for automatically using the formula or formulae. The invention system may determine the high price and the low price by, in the former case adding the premium to the standard price, and in the latter case, subtracting the discount from the standard price. The buyer may fix multiple values for the discount resulting in multiple spreads resulting in multiple pricing options to the buyer. The buyer may fix multiple values for the premium resulting in multiple spreads resulting in multiple pricing options to the buyer. The buyer may identify a selected attribute other than from the list provided by the seller. The buyer may simultaneously select multiple selected attributes.

The invention system may arrange the selected attribute in such a nature that it can be controlled by the seller or performer of the goods or services, and the seller is provided with data prior to the event or service about the aggregate of the premiums that the seller will realize based on the positive occurrence of the controllable selected attributes which information is used to inform the seller's pricing decisions.

The client system and server system may communicate via the Internet.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 illustrates a sample table from the seller database of HG. 2;

FIG. 4 illustrates a sample table from the buyer database of FIG. 2;

FIG. 5 illustrates a sample table from the final OBP offer price and settlement database of FIG. 2;

FIG. 6 illustrates a sample table from the selectable attribute database of FIG. 2;

FIG. 7 illustrates a sample table from the statistical database of FIG. 2;

FIG. 8 illustrates a sample table from the seller rules database of FIG. 2;

FIG. 9 illustrates a sample table from the available inventory and standard pricing database of FIG. 2;

FIG. 10 illustrates a sample table from the selected attribute outcome database of FIG. 2;

FIG. 11 illustrates a sample table from the offer price database of FIG. 2;

DETAILED DESCRIPTION OF THE INVENTION

Figure 1:
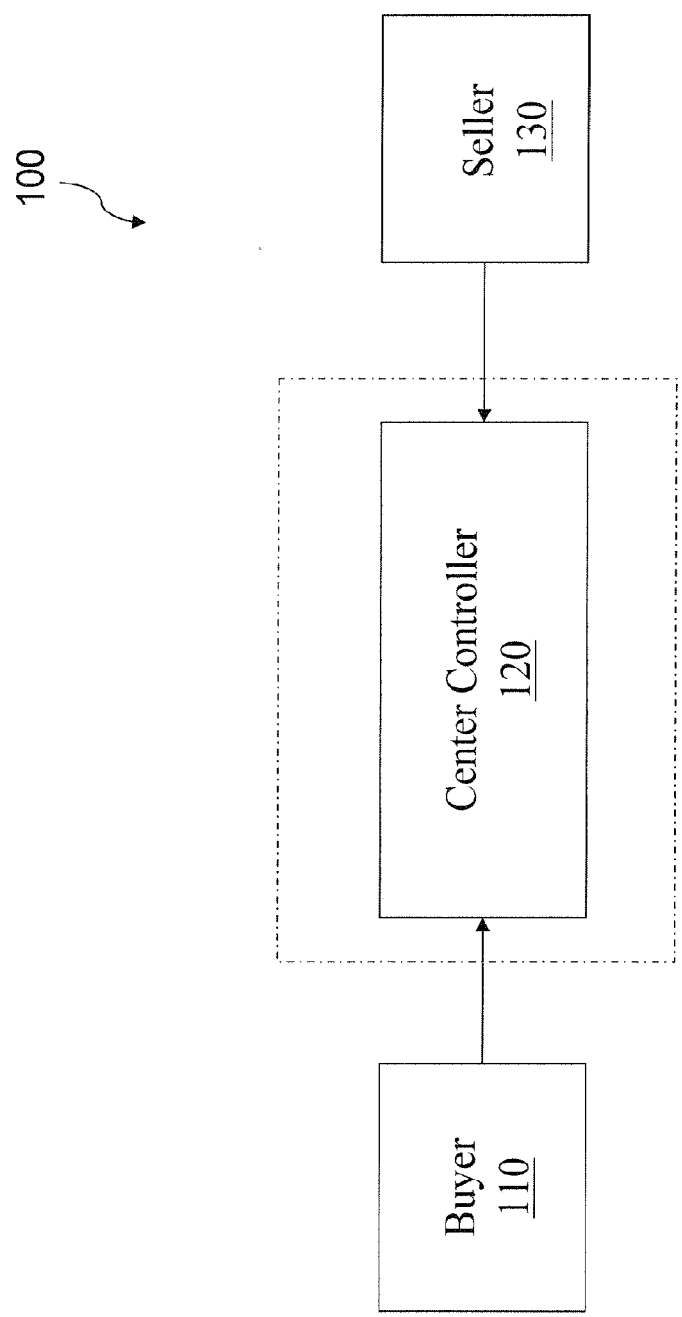
FIG. 1 is a block diagram illustrating an Outcome Based Pricing (OBP) system in accordance with the present invention.

A description of example embodiments of the invention follows.

The present invention allows sellers of goods, including tickets to a variety of event performances, and services, to set prices based on the attributes that have undefined or unknown outcome (occurrence) when the purchase is made. Through this pricing methodology, the ultimate price paid by the buyer more closely reflects the value realized by the buyer, and the payment received by the seller more closely reflects the value delivered by the seller. While it has application in offline sales as well, the current invention is best suited to the purchases made over the Internet.

Outcome Based Pricing and Settlement Methodology

Pricing Engine

Outcome based pricing (OBP) is a method that enables prices to be set for goods or services at a price that varies depending on the occurrence of one or more attributes potentially associated with such goods and services, the occurrence of which will not be known until after the event or service. For example, a price of a specific seat for a spectator sporting event would typically be a fixed $50.00 under the seller's standard pricing system. However, since a buyer gets more value out of a win by his favorite spectator sports team than a loss, the buyer and seller might agree that buyer will pay $40.00, a $10 "discount", if the buyer's favorite team loses, and $60.00, a $10 "premium," if the buyer's favorite team wins. The process by which OBP allows the seller and buyer to establish a price is referred to as the OBP pricing engine ("PE") for purposes of this application.

Because of the uncertainty of the attributes that may be selected by a buyer using the OBP system, OBP introduces uncertainty into the total revenues that a seller can expect to receive from the sale of tickets over a period of time. This uncertainty has the potential to result in significant variability in the gross revenues generated from sales. The current invention allows for the setting of discounts and premiums for a given unit based upon the statistical probability of an attribute potentially associated with such event or service. As a result, the ultimate price payable for a given unit over a statistically significant sample of events can be managed so that gross receipts are more predictable. This is accomplished by accessing a database that contains the statistical probabilities of the attributes that the buyer is permitted to choose from and then using these probabilities in a formula to determine the discounts and premiums relative to the standard price of the ticket under conventional pricing methods. Such mathematical relationships, which shall be established by the seller in accordance with the seller's business objectives, will allow the seller to maintain a more predictable level of cash flow than might otherwise result using OBP. Using this approach, if the statistical probabilities bear out, aggregate premiums above the standard price paid by a set of buyers could be set so as to offset, exceed or be less than aggregate discounts below the standard price paid by such buyers. The formula fixed by the seller that establishes this mathematical relationship is referred to herein as the "Base Rule". The process by which OBP allows the seller to establish prices using statistical probabilities in order to moderate or control revenue deviation is referred to as the intelligent pricing engine (IPE) for purposes of this application.

Settlement Engine

Since the ultimate price to be paid by the purchaser under the OBP system will not be known until after the purchase, the system raises a fundamental question regarding the timing and mechanics related to the settlement of the transaction. Should the buyer be charged at the time of the order when the final price is unknown, after the event at which the final price will be known, or a combination of the two? Under the OBP system, the seller can charge the buyer a certain amount up front, and then if the final price is different, settle with the buyer at the time the final price is established (the "Two Step Settlement Approach"). Under this approach, if the price paid by the buyer at the time of the order is higher than the final price, the seller can settle with the buyer either by issuing a credit card refund or merchandise credit against future purchases, or by allowing the buyer to receive a refund or merchandise credit. Other techniques and methods for crediting the buyer are suitable (e.g., payment toward a membership or awards clubs or the like), if the price paid by the buyer is lower than the final price, the seller can settle by charging the credit card of the buyer an additional fee after the event. As an alternative approach, the seller could wait until the final price is established after the event and charge the buyer the full amount at that time (the "One Step Settlement Approach").

Regardless of whether the seller and purchaser contract under the One Step Settlement Approach or Two Step Settlement Approach, the final price will need to be ascertained after the event has occurred or the service delivered, and a final settlement of the purchase will be necessary. The OBP system monitors the event for which the ticket was purchased, or the service ordered, and once the event is over or the service is delivered, based on whether the selected attribute or attributes occurred, settles the transaction. The process by which OBP automatically ascertains the final price based on the OBP system, and settles the transaction through either a credit or charge or the like to the buyer, is referred to as the intelligent settlement engine ("ISE") for purposes of this application.

In summary, the current invention allows sellers to offer goods, specifically event tickets, and certain services, at prices that vary depending on what transpires during the event or service. By applying certain formula-based pricing rules, including for example pricing based on statistical probabilities, the seller can deploy OBP and minimize significant deviation from a pre-determined revenue plan, or alternatively build-in an increase or even decrease in sales revenues. In addition, the current invention allows for the automated order, payment and final settlement of the purchase transaction. The preferred embodiment for the OBP system is via a computer network that includes the Internet.

Representative OBP Transaction

Seller Perspective

The Red Sox and their 2008 season have been used hereinafter as a non-limiting example of an institution that may incorporate OBP as a pricing option or alternative. In this example embodiment, the Red Sox are selling tickets to their 2008 season and have decided to incorporate OBP as a pricing option for a certain number of seats for each game. In this example, one pricing objective is to offer tickets using OBP so that the discount and premiums exactly offset each other over a statistically significant sample set of games resulting in no deviation from the standard price for tickets sold using OBP—the "Zero Deviation Base Rule." In this example, the Red Sox also want to offer buyers several different selectable attributes to choose from, of which the buyer may be required to select at least one, and a range of pricing options based on the selected attribute all of which satisfy the Zero Deviation Base Rule.

The Zero Deviation Base Rule is as follows:

(probability of Selected Attribute)×(premium)=(1 minus Probability of Selected Attribute)×(discount)

Since there are two additional unknown variables in the above formula, namely "premium" and "discount", the Red Sox must either pick a value for one of the two variables or introduce a second formula as part of the Base Rule that establishes a linear relationship between the two variables that must be satisfied simultaneously with the Zero Deviation Base Rule. The Red Sox choose to fix the discount, and since they wish to offer multiple pricing options, selecting three discounts—$10.00, $20.00 and $30.00. The corresponding premiums, and resulting high and low prices, are derived from solving the Base Rule using these discounts.

On Apr. 30, 2008, the OBP system receives an order from a fan for a grand stand seat to a Red Sox/Yankee game on Aug. 1, 2008. The Red Sox have offered multiple selectable attributes to the buyer and the buyer has selected "Red Sox Win" as the selected attribute, for non-limiting example. The OBP system pulls the probability of the selected attribute—Red Sox win—from a database and determines that the probability in this particular case is 0.67. The probability is then entered into the pricing formula along with the specified discounts and the premium that corresponds with each specified discount is solved for three times as follows:

(0.67)×(premium Payment)=(1−0.67)×($10.00)

premium Payment=0.33/0.67×$10.00 premium Payment=$5.00

This equation is solved for two more times with the two remaining discounts, $20.00 and $30.00, and results in corresponding premiums of $10.00 and $15.00 respectively.

The OBP system then pulls the standard price for the selected ticket and solves for the three pricing options by subtracting the discount from the standard price and adding the corresponding premium to the standard price for each of the three stipulated discounts as follows where the standard price for the selected ticket is $50.00:

$50.00+$5.00=$55.00=high price 1

$50.00−$10.00=$40.00=low price 1

$50.00+$10.00=$60.00=high price 2

$50.00−$20.00=$30.00=low price 2

$50.00+$15.00=$65.00=high price 3

$50.00−$30.00=$20.00=low price 3

Therefore, in this example the Red Sox will offer the buyer three different pricing options under OBP with the high price being the price paid if the Red Sox win and the low price being the price paid if the Red Sox lose. In this case the three options are (i) $40.00 lose and 555.00 win, (ii) $30.00 lose and $60.00 win, and (iii) $20.00 lose and $65.00 win.

The buyer selects the first option with the contractual understanding that he will pay the high price at the time of the purchase and be repaid the difference between the high price and low price after the game if the Red Sox lose by receipt of a $15.00 credit on his credit card or otherwise effected. A charge of $55.00 is applied to the buyer's credit card on Apr. 30, 2008.

After Aug. 1, 2008, the OBP system pulls the result of the game from a database, and because the Red Sox lost the game, initiates a $15.00 credit to the buyer's credit card.

Buyer Perspective and User Interface.

With the invention in practice, a purchaser seeking to make a ticket purchase online via the Internet would first go to a website at which tickets are offered for sale by a seller for a particular event or service. Through a user interface, the customer would be offered two choices: 1) the option to pay a fixed, up front fee using conventional pricing at the standard price; or 2) the option to use OBP. If the conventional pricing model is chosen, the ticket is ordered and fulfilled using standard, e-commerce fulfillment practices. However, if OBP is chosen, a new pricing and payment method is deployed.

The following is an illustrative non-limiting example:

The buyer is a Red Sox fan who on Apr. 30, 2008, is purchasing a single grandstand seat for a New York Yankees game at Fenway Park that will take place on Aug. 1, 2008, over the Internet. After the buyer identifies a seat he is interested in, the standard price of the ticket using the current pricing method is displayed. Alongside the standard price for the ticket, the buyer is offered the option of viewing the price options that would result from the OBP method. The next display screen might display the following information:

standard ticket price is $50.00, click through to purchase now, or click through to see OBP ticket price options.

The buyer selects OBP pricing. Other arrangements for displaying OBP ticket price options are suitable.

Selectable Attributes

Red Sox then offer the buyer a range of attributes to choose from as follows, and the buyer is instructed to select one, for non-limiting example:

Red Sox win

Red Sox win by shutout

Red Sox win on home run in $9^{th}$ inning

Red Sox win by no hitter

Opponent wins

The buyer selects the first attribute, "Red Sox win".

Pricing Options

Upon making this selection, the buyer is presented with a range of pricing options associated with the selected attribute "Red Sox win." The range of possible OBP pricing options offered by the Red Sox, which vary in this case based on the spread between the price paid in the event of a Red Sox win verses a Red Sox loss, might be presented as follows with instructions for the buyer to select one:

If Red Sox win, Final price=$55.00, but if Red Sox lose, Final price=$40.00.

If Red Sox win, Final price=$60.00, but if Red Sox lose, Final price=$30.00.

If Red Sox win, Final price=$65.00, but if Red Sox lose, Final price=$20.00.

Return to standard pricing option of $50.00.

The buyer selects the first option, thereby agreeing to pay $55.00 if the Red Sox win, and $40.00 if the Red Sox lose, on Aug. 1, 2008.

Settlement

The buyer submits credit card (or other form of payment) and other identifying information to the OBP system and his credit card is charged $55.00 on Apr. 30, 2008. The buyer understands that if the Red Sox lose, the buyer will be credited $15.00 (via credit card used to make the initial purchase or other form of payment).

The Red Sox lose the game on Aug. 1, 2008. The Red Sox automatically apply a credit of $15.00 to the buyer's credit card the day after the game attended by the buyer and the credit shows up on the buyer's next statement.

Seller Customization of OBP

The non-limiting example of OBP above illustrates certain options available to the seller when using the invention OBP system. The Base Rule in the above example is set to result in zero deviation from the standard price—the Zero Deviation Base Rule. The buyer is given multiple selectable attributes to choose from. The buyer is only allowed to select one attribute (in one example), but the buyer is given multiple pricing options to choose from based on the selected attribute. In any given situation the seller can modify the buyer options along the following dimensions—the Base Rule formula, the number of selectable attributes to choose from, the number of selectable attributes that may be chosen, and the number of pricing options that correspond with a given selected attribute or attributes. Other dimensions are suitable. The seller can also solicit the buyer's input on these dimensions.

Base Rule

Static Base Rule

The Base Rule could be as simple as fixing the discount and premium without the need for any formula. For example, the Base Rule could be that the premium shall be $10.00 if the selected attribute occurs (a "positive occurrence") and the discount shall be $20.00 if the selected attribute does not occur (a "negative occurrence").

Zero Deviation Base Rule

Per the above illustration, the Base Rule can be set so that the discount and premiums relate to the standard price so they exactly offset each other over a statistically significant sample set of games resulting in no deviation from the standard price in the aggregate.

The Zero Deviation Base Rule is as follows:

(probability of Selected Attribute)×(premium)=(1 minus Probability of Selected Attribute)×(discount)

Plus Deviation Base Rule

The seller can set the Base Rule such that the resulting ticket price is on average a certain dollar amount higher than the standard price. In order to accomplish this objective, the seller modifies the Zero Deviation Base Rule formula by changing the relationship between the discount and the premium to reflect the desired built-in premium, say $2.00 for non-limiting example.

The Plus Deviation Base Rule is as follows:

(probability of Selected Attribute)×(premium Payment)=[(1 minus Probability of Selected Attribute)×(discount)]+$2.00

Minus Deviation Base Rule

Similarly, the seller can use OBP to establish a Base Rule such that the resulting ticket price is on average a certain dollar amount lower than the standard price. In order to accomplish this objective, the seller modifies the Zero Deviation Base Rule formula by changing the relationship between the discount and the premium to reflect the desired built-in discount, say $2.00 for non-limiting example.

The Minus Deviation Base Rule is as follows:

(probability of Selected Attribute)×(premium Payment)=[(1 minus Probability of Selected Attribute)×(discount)]−$2.00

Range of Selectable Attributes

The seller can offer the buyer the option of choosing from just one selectable attribute, or a range of selectable attributes as was the case in the above example. The seller may also pre-define the list of selectable attributes or allow the buyer to further define (i.e., add to) the list of selectable attributes. Other configurations of selectable attributes lists are suitable. The only limitation from the seller's perspective is that if the seller is deploying a Base Rule that includes a statistical probability variable, the listed and selected attributes need to have a probability that the OBP system can pull from a database in order to insert that variable in the Base Rule formula.

Number of Selected Attributes

The seller may allow the buyer to select just one of the selectable attributes as in the above example, or more than one selectable attribute. If multiple attributes are selected, they can dependently affect the pricing as a "package" (i.e. if all three selected attributes occur, then price is X, but if not all 3 occur, then price is Y), or independently (i.e. if selected attribute 1 occurs, premium 1 is applied irrespective of selected attributes 2 and 3, the occurrence of which also have respective independent impact on the price.)

If there are multiple attributes that are selected by the buyer, and each independently impacts the price, then the Zero Deviation Base Rule would instead be a summation equation of each selected attribute. For example, if there are 3 selected attributes chosen, then the Base Rule formula could be:

(Probability of Selected Attribute1×premium Payment1)+(Probability of Selected Attribute2×premium Payment2)+(Probability of Selected Attribute3×premium Payment3)=(1 minus Probability of Selected Attribute1×discount1)+(1 minus Probability of Selected Attribute2×discount2)+(1 minus Probability of Selected Attribute3×discount3)

Multiple Pricing Options

The seller could also provide the buyer several pricing options where the Base Rule is satisfied but the difference between the high and low prices, or "spread", varies so there are multiple pricing options to choose from. This can be done either by fixing several discounts (as was done in the above example) or premiums, or alternatively by establishing additional mathematical relationships beyond the Base Rule that must be satisfied. For example, the same result achieved in the example above could have been achieved by requiring the three pricing options satisfy the following additional formulas, which establish "spread" requirements between the high price and low price, in addition to the Base Rule:

discount+premium=$15.00
discount+premium=$30.00
discount+Premium=$45.00

Solicitation of Buyer Input

The seller could also choose to allow the buyer to have direct input into the pricing options by, for example, (i) defining the selected attributes, (ii) selecting the premium or discount, or (iii) choosing one or more "spreads". The following are examples in which the seller can solicit the input of the buyer to establish the pricing options.

Buyer Driven Selected Attributes

Rather than providing a single or limited pre-selected set of selectable attributes, the seller can allow the buyer to choose a selected attribute from a much broader, more open ended selection, or to suggest a selected attribute independent of any list offered by the seller. The seller could also allow the buyer to choose multiple selected attributes.

Buyer Driven Discount

The seller could ask the buyer how much the buyer wants as a discount off the standard price in the event of a loss, and then provide the buyer with a premium above the standard price that the buyer would need to pay in the event of a win in order to receive the stated discount off the standard price in the event of a loss. This would not require a new Base Rule, just a fixing of the discount variable per the buyer's request.

Buyer Driven Premium

As an additional alternative, the seller could ask the buyer how much of a premium the buyer would be willing to pay above the standard price in the event of a win, and then provide the buyer with a discount that would be applied in the event of a loss in exchange for the buyer's willingness to pay the stated premium for a win. This would not require a new Base Rule, just a fixing of the premium variable per the buyer's request.

Buyer Driven Spread

As a third alternative, the seller could ask the buyer to specify one or more desired spreads and present one or more pricing options that satisfy these spreads.

Other Customizable Features

In addition to flexibility in establishing the pricing options, OBP can offer flexibility on other features of the platform, such as the mechanics of settlement, as well as enable the seller to improve its profitability through performance recommendations and promotions.

Alternative Settlement Options

Instead of charging the buyer's credit card the full price at the time of the original purchase, the buyer could charge the credit card only when the outcome of the Selected Attribute is known, or could charge the buyer the price that assumes the attribute does not occur then charge an additional amount if the attribute occurs, or the buyer could offer a merchandise credit to settle the difference in the event of a loss. In addition, instead of settling the final payment through a credit card transaction the seller could provide the buyer with store credit or cash redemption offer.

Controllable Selected Attributes and Performance Recommendations

For certain types of performances, such as a sporting event or live music concerts, there are aspects of the performance that can be controlled either by the promoters or performers—for example, the presence of a specific athlete in the lineup for a given game, or the inclusion of a specific song at a music concert. For such performances, the current invention will include a feature that allows the aggregate data gathered from the buyers' selection of selectable attributes, such as the playing of a particular song during a music concert, to be captured, analyzed and presented to the sellers. The sellers will be able to use this data to direct the performers to ensure that certain occurrences that will result in a premium in fact occur during the main performance resulting in higher gate revenues. This will allow the seller and performer to maximize revenue from the sale of tickets. Over time OBP will serve the additional benefit of allowing sellers to model various pricing scenarios as a revenue projection tool by allowing the seller to develop a database that can be used to calculate the price elasticity of demand for various "attributes" or combinations thereof.

Promotions

The OBP system can be used to enable the seller to offer a broad range of promotions where the promotion being offered ties in some way to the outcome of the event. For example, the seller could provide random discounts at significantly below the standard price by setting the discount to some substantially lower number than usual for every 1000 ticket buyer. This would create an incentive for buyers to use the OBP. As an alternative, the seller could increase tickets for an upcoming season, but only for games in which the seller's team wins.

Reduction of OBP Pricing Methodology to Practice

The current invention will be reduced to practice as a software platform that will enable the seller of goods, specifically tickets to certain events, and certain services to deploy the OBP system. The ticket sellers will be able to use the flexibility of the OBP method to determine optimal pricing strategies that incorporate OBP to achieve sales objectives, including an increase in overall sales and increased revenue from existing sales. From the buyer's perspective, the OBP method offers buyers an option of purchasing units at a price that is more commensurate with the value they receive, and a richer, more interactive ticket sales experience that incorporates gaming elements.

FIG. 1 shows an OBP management system 100 for receiving and processing OBP purchase orders from a buyer 110 of a particular good (specifically a ticket to an event such as an athletic contest, music concert or similar live performance) or service (such as airline transportation), from a particular seller 120 of a particular event or service, where the price to be paid by the buyer depends on the one or more attributes potentially characteristic of the event or service. The OBP management system enables the buyer 110 and seller 120 to agree on two (or more) prices for a particular event or service at the time of the purchase. The lower of the two prices is the price that the buyer 110 will pay if a specific attribute potentially characteristic of a particular event or service does not in fact occur (a negative occurrence). The higher of the two prices is the price that the buyer 110 will pay if a specific attribute potentially characteristic of a particular event or service does in fact occur (a positive occurrence). The OBP system calculates these prices using rules established by the seller 120 which comprise one or more equations that establish mathematical relationships between a set of variables including, among possible others, the probability of the selected attribute occurring, the standard price for the event or service purchased, the premium to be paid in the event of a positive occurrence, and a discount to be credited in the event of a negative occurrence. The OBP system will monitor a set of attributes associated with the purchased event or service, calculate the final contract price, the amount of final settlement, and allow for the automated settlement of the purchase after the event or service is complete by charging or crediting the buyer 110.

Figure 2:
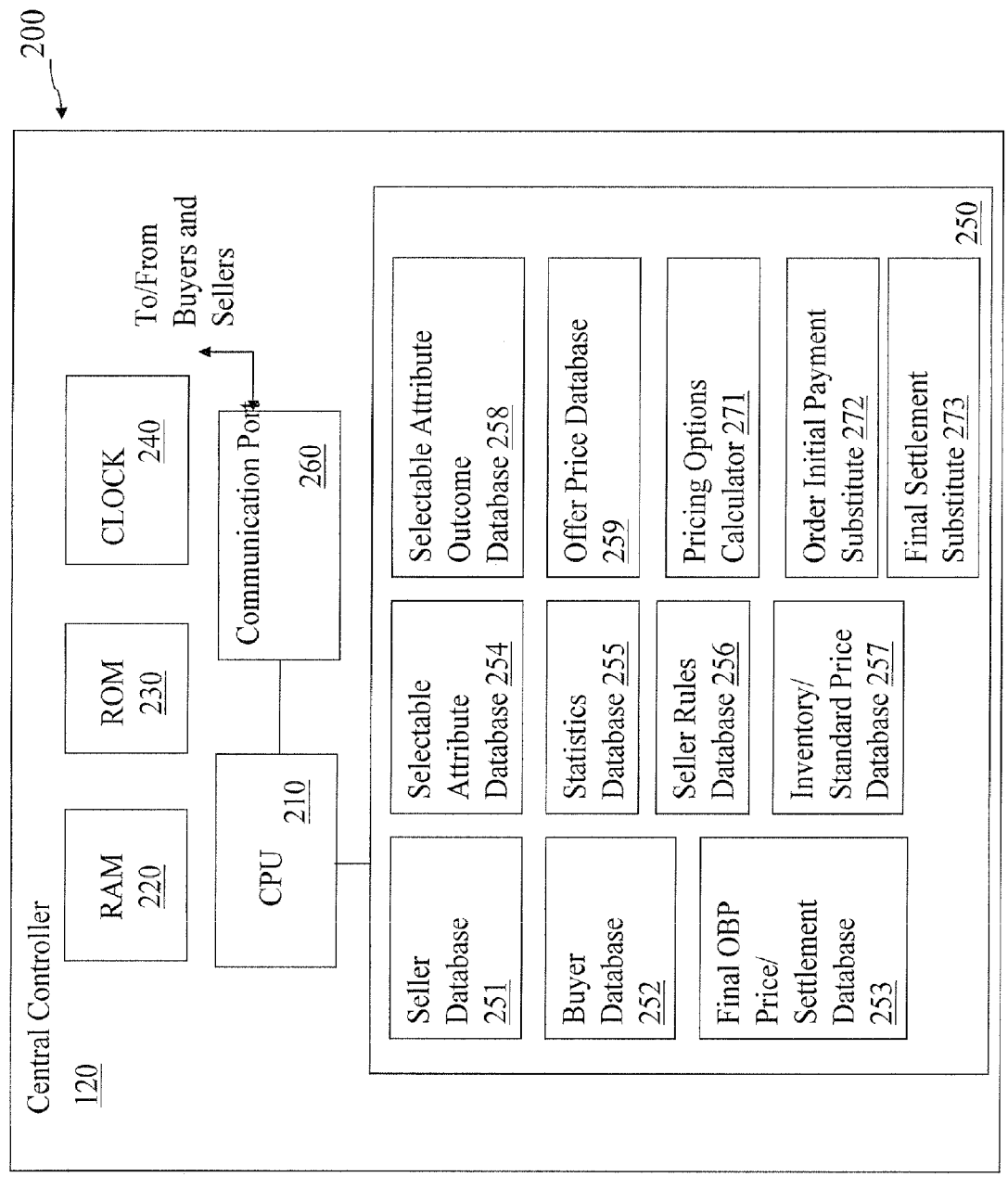
FIG. 2 is a block diagram of the example central controller and database(s) of FIG. 1.

FIG. 2 is a block diagram 200 showing the architecture of an illustrative central controller 120. The central controller 120 includes certain standard hardware components, such as any of a central processing unit (CPU) 210, a random access memory (RAM) 220, a read only memory (ROM) 230, a clock 240, a data storage device 250, and a communications port 260. The CPU 210 can be linked to other elements such as the data storage device, either by means of a shared data bus, or dedicated connections. The communications port 260 connects the central controller 120 to each buyer 110 and seller 120 and optionally to a remote credit processing servers. The communications port 260 may include multiple communication channels for simultaneously establishing a plurality of connections.

Figure 12:
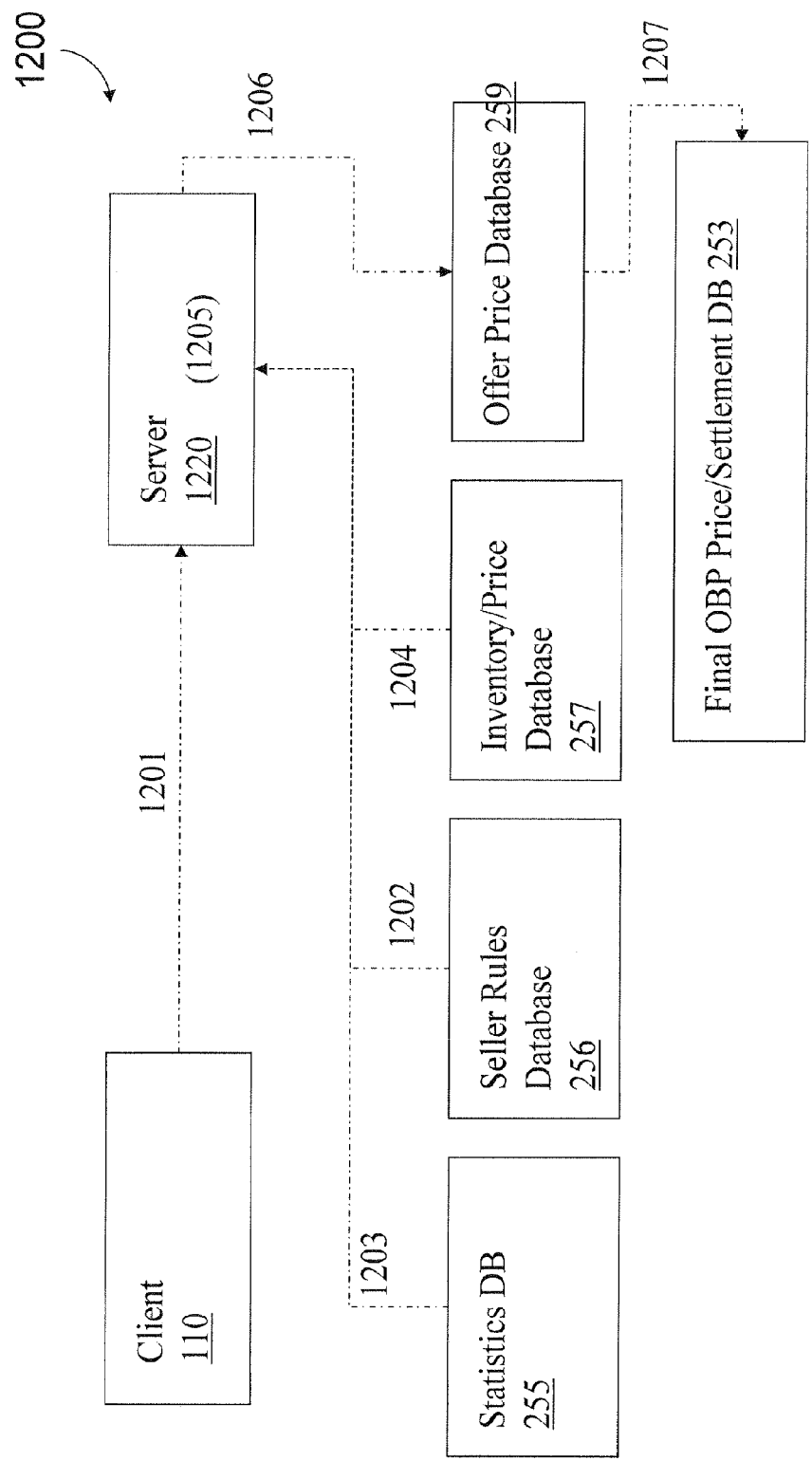
FIG. 12 is a flowchart describing an example OBP price determination subroutine implemented by the central controller of FIG. 2.
Figure 13:
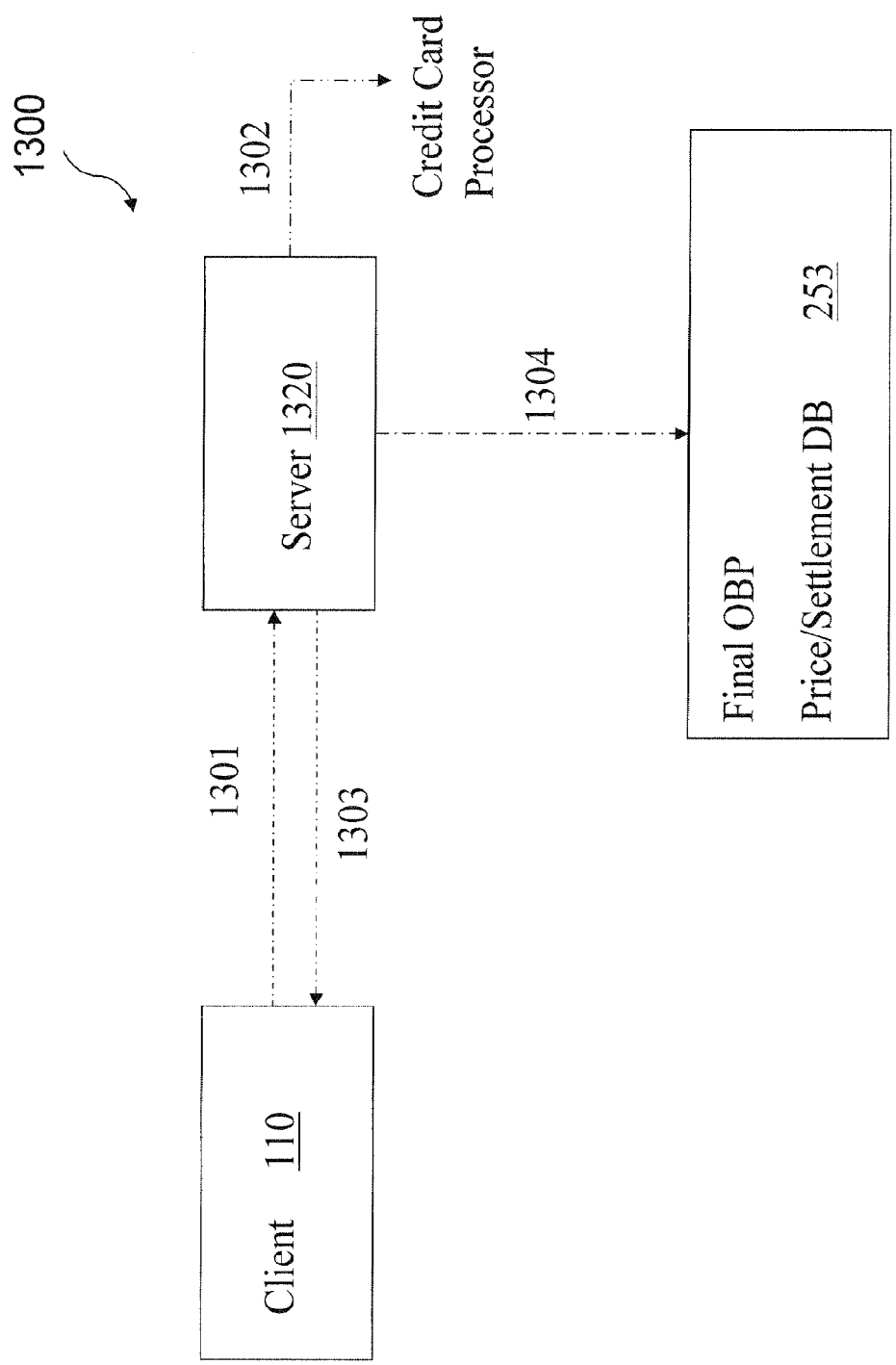
FIG. 13 is a flowchart describing an example OBP order subroutine implemented by the central controller of FIG. 2.
Figure 14:
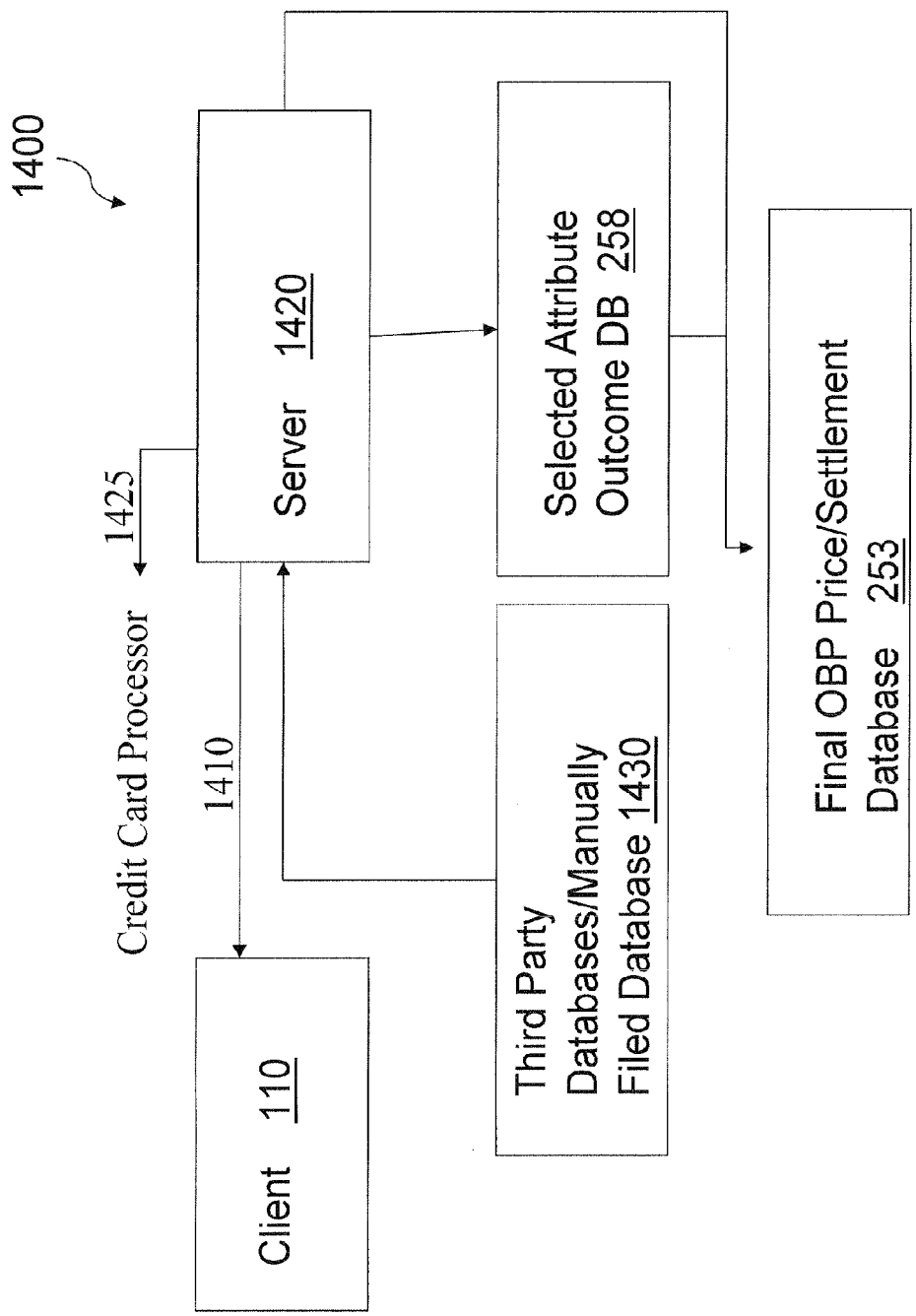
FIG. 14 is a flowchart describing an example OBP buyer settlement subroutine implemented by the central controller of FIG. 2.

The ROM 230 and/or data storage device 250 are operable to store one or more instructions, to be discussed in conjunction with FIGS. 12, 13 and 14, which the CPU 210 is operable to retrieve, interpret and execute. For example, the ROM 230 and/or data storage device 250 can store processes to accomplish the calculation of the OBP pricing options 271, process an initial order between the sellers and buyers 272 and execute the final settlement following the occurrence of the event 273.

The data storage device 250 includes a seller database 251, a buyer database 252, a final OBP price and settlement database 253, a selectable attribute database 254, a statistics database 255, a seller rules database 256, an available inventory and standard pricing database 257, a selected attribute outcome database 258, and an offer price database 259. The seller database 251 stores information on each seller 120 which is registered with the OBP management system 100, including identification information and contact information. The buyer database 252 stores information on each buyer transacting business through the OBP management system 100, including identification information and billing information, such as a credit card number or another general-purpose account identifier. The final OBP price and settlement database 253 contains a record of each purchase processed by the OBP management system 100, including the ticket or service purchased, the selected attribute, the high and low contractual price to be paid based on the occurrence of the selected attribute, the price paid at the time of purchase, and the contingent settlement amount. The selectable attribute database 254 contains all selectable attributes for each seller 120 associated with a particular event or service. The statistics database 255 contains the probabilities of some or all selectable attributes. The seller rules database 256 includes the formulae for determining the high and low price for purchases as determined by the seller 120. The available inventory and standard price database 257 contains the standard price under the conventional pricing system for all goods and services offered using the OBP management system. The selectable attribute outcome database 258 contains the outcome for each selectable attribute once the outcome is known, i.e., after the event or service occurs. The offer price database 259 contains the various high and low prices offered by a particular seller 120 to a particular buyer 110 with respect to a particular ticket or service based on the selected attribute for such ticket or service by such buyer 110 prior to the buyer 110 making a final purchase decision and entering into contract with the seller 120.

In addition, the data storage device 250 includes three subroutines. The OBP price determination subroutine 271 includes the steps of (i) receiving from a buyer 110 a chosen selected attribute, (ii) calling the applicable formula for calculating the premium and discount from the seller rules database 256, (iii) calling the applicable statistics from the statistics database 255, and (iv) calculating the high and low offer price or prices for a specific ticket or service among which the buyer 110 may select in order to enter into a contract to purchase such ticket or service. The order subroutine 272 is a subroutine executed by the OBP management system where the buyer 110 places an order, a charge is initiated to the buyer's 110 credit card, and the final OBP price and settlement database 253 is populated with the information specific to the purchase. The settlement subroutine 273 is a subroutine by which the selectable attribute outcome database 258 is populated on an ongoing basis to store the outcome of each selectable attribute, which data is used in turn to update the final OBP price and settlement database 253 to complete the data field for a given OBP transaction that corresponds to the settlement amount, after which the settlement is automatically initiated by issuing a credit or debit to the account of the buyer 110.

The following are illustrative databases for deployment of the OBP pricing and settlement system as applied to the purchase and sale of tickets to professional baseball games.

FIG. 3 illustrates an example embodiment 300 of the present invention in which a seller database 251, which is registered with the OBP management system 100, stores information on each seller. The seller database 251 maintains a plurality of records, such as records 305, 310, 315 and 320, each associated with a different seller. For each seller identifier 330, the seller database 251 includes the corresponding seller name 340, as well as the seller account number in fields 350 and other factors 360, respectively. The seller identifier stored in field 330 may be utilized, for example, to index a historical database (not shown) of previous OBP sales made by seller.

FIG. 4 illustrates an example embodiment 400 of the present invention in which a buyer database 252 stores information on each buyer transacting business through the OBP management system 100, including biographical information and billing information, such as a credit card number or another general purpose account identifier. The buyer database 252 maintains a plurality of records, such as records 405, 410, 415 and 420, each associated with a different buyer. For each buyer identifier in field 430, the buyer database 252 includes the corresponding buyer name and address in fields 440 and 450, respectively, and credit card account number in field 460. The buyer identifier stored in field 430 may be utilized, for example, to index a historical database (not shown) of previous OBP purchases made by the buyer.

FIG. 5 illustrates an example embodiment 500 of the final OBP offer price and settlement database 253 that stores information on each transaction being processed by the OBP management system 100. The final offer price and settlement database 253 maintains a plurality of records, such as records 505, 510, 515 and 520, each associated with a different transaction. For each transaction identified by the OBP tracking number in field 530, the final OBP offer price and settlement database 253 includes the corresponding buyer identifier in field 535, seller identifier in field 540, date identifier in field 545, seat identifier in field 550, selected attribute in field 555, price paid at time of contract in field 560, price to be paid in the event the selected attribute does not occur in field 565, price to be paid if the selected attribute occurs in field 570, the status of the selected attribute (either "open" meaning either that it is not yet determinable as to whether the selected attribute(s) has occurred, and "closed" meaning that it is known as to whether the selected attribute(s) has occurred) in field 575, the occurrence of the selected attribute(s) in field 580 for the selected attribute(s) that are "closed", the settlement payment or credit, if any, owed on specific transactions for "closed" selected attributes in field 585, and the status of the settlement in field 590.

FIG. 6 illustrates an example embodiment 600 of the selectable attribute database 254 that stores information on each selectable attribute offered by a particular seller for transactions being processed using the OBP management system 100. The selectable attribute database 254 maintains a plurality of records, such as records 605, 610, 615, 620 and 625, each associated with a particular game date for which pricing is offered using the OBP management system. For each game date identified in field 630, the selectable attribute database includes a list of selectable attributes (e.g., 640, 650, 660, 670) that are available for such game.

FIG. 7 illustrates an example embodiment 700 of the statistical database 255 that stores information on the probability for each selectable attribute offered by a particular seller for transactions being processed using the OBP management system 100. The statistics database 255 maintains a plurality of records, such as records 705, 710, 715, 720 and 725, each associated with a particular game date for which pricing is offered using the OBP management system. For each game date identified in field 730, the statistics database 255 includes the probability for each selectable attribute for such event including the probability of a selectable attribute 1 in field 740, the probability of selectable attribute 2 in field 750, the probability of selectable attribute 3 in field 760 and the probability of selectable attribute 4 in field 770. It is noted that the OBP system will enable the real time calculation of probabilities to be stored in this database based on raw data of historical events.

FIG. 8 illustrates an example embodiment 800 of the seller rules database 256 that stores information on the pricing rules for each seller using the OBP management system 100. The seller rules database 256 maintains a plurality of records, such as records 805, 810, 815 and 820, each associated with a particular seller that is offering goods or services using the OBP management system 100. For each such seller identified in field 830, the seller rule database includes a series of rules establishing the mathematical formula or formulae pursuant to which the prices corresponding to a particular good or service is to be calculated, including the base rule in field 840, the relationship between the discount and premium 850, if any, established by the seller in field, and any other relationships 860 that may be applicable including for those events/services in which the seller is offering more than one combination of high/low prices to choose from.

FIG. 9 illustrates an example embodiment of the seller available inventory and standard pricing database 257 that stores information on the standard prices each seller offers for seats that are available and offered for sale using the OBP management system. The seller standard pricing database maintains a plurality of records, such as records 905, 910, 915, 920 and 925, each associated with a particular game date for sales offered using the OBP management system. For each game date identified in field 930, the available inventory and standard pricing database 257 includes each unit for which OBP pricing is offered in field 940, and the standard price for such unit in field 950.

FIG. 10 illustrates an example embodiment 1000 of the selectable attribute outcome database 258 that stores information on the outcome for each selectable occurrence offered by a particular seller for transactions being processed using the OBP management system 100. The selectable attribute outcome database 258 maintains a plurality of records, such as records 1005, 1010, 1015, 1020 and 1025, each associated with a particular game date for which pricing is offered using the OBP management system. For each such game date identified in field 1030, the selectable attribute outcome database 258 includes the outcome for such selectable attribute when it is known, including the outcome for selectable attribute 1 in field 1040, the outcome for selectable attribute 2 in field 1050, the outcome for selectable attribute 3 in field 1060 and the outcome for selectable attribute 4 in field 1070. It is noted that this database may be populated manually using data entry or by pulling the data from existing third party databases.

FIG. 11 illustrates an example embodiment 1100 of the offer price database 259 that stores pricing information for each OBP tracking number before entering the contract for purchase. The offer price database 259 offers a plurality of records, such as records 1105, 1110 and 1115, each associated with an OBP tracking number for which a specific request has been made by a potential buyer for the pricing of tickets offered for sale using the OBP management system. For each such OBP tracking number identified in field 1120, the offer price database 259 includes the prices at which the tickets are being offered to the buyer, including the high price corresponding to the positive occurrence of the selected attribute in field 1130, the low price corresponding to the negative occurrence of the selected attribute in field 1140, and, where multiple pricing options are offered, the second option high price in field 1150, the second option low price in field 1160, etc.

Processes

FIG. 12 illustrates a flowchart 1200 describing an example OBP order subroutine implemented by the central controller 120 of FIG. 2, according to an example embodiment of the present invention. The central controller 120 can execute a subroutine in order to calculate 271 the high price and low price that satisfy the Base Rule. This subroutine includes the steps of the server 1220 receiving a selected attribute and request for the OBP price options from buyer 110 (1201);

calling the applicable formula from the seller rules database 256 (1202);

calling the probability variable 1203, if any, from the seller statistics database 255 (1203);

calling the standard price from the available inventory and standard price database 257 (1204);

performing the calculation of the premium and discount and solving for the high and low prices (1205);

storing the resulting high price and low price in the offer price database 259 (1206); and if the buyer 110 accepts one of the OBP pricing options, storing the final low price and high price in the final OBP price and settlement database 253 (1207).

FIG. 13 is a flowchart 1300 describing an example OBP order subroutine implemented by the central controller 120 of FIG. 2, according to an example embodiment of the present invention. The central controller 120 may execute a subroutine in order to process an order and the initial payment settlement 272. This subroutine 272 includes the steps of:

receiving at a server 1320 an order at a price specified by the buyer 110 (1301);

initiating a charge through the credit card processor or other payment mechanism 1302;

sending an electronic receipt to the buyer 110 (1303); and storing in the final OBP price and settlement database 253 the price paid by the buyer 110, and the other information necessary to identify the buyer with the purchase 1304.

FIG. 14 is a flowchart 1400 describing an example OBP buyer settlement subroutine implemented by the central controller 120 of FIG. 2, according to an example embodiment of the present invention.

The central controller 120 can execute a subroutine 273 in order to execute the final settlement after the event for which the purchase is made is completed and the outcome of the selected attribute is known. This subroutine 273 includes the steps of:

a server 1420 calling from third party databases 1430 (if the database is not populated manually) the outcome of selected attributes and storing such information in the selected attribute outcome database 258;

when the selected attribute outcome database 258 shows that a selected attribute for a given purchase is "closed", meaning the event or service has been completed, storing such status in the final OBP price and settlement database 253 in field 575 for the applicable OBP tracking number for which the event identifier and selected attribute correspond;

when the selected attribute outcome database 258 shows that the occurrence of the selected attribute has been ascertained, meaning that the actual occurrence of the selected attribute is known and entered as either "positive" or "negative", storing such outcome in the final OBP price and settlement database 253 in field 580 for the applicable OBP tracking number;

initiating 1425 a final settlement charge or credit to the buyer 110 in an amount reflected in field 585 depending on whether the occurrence was positive or negative;

sending 1410 an electronic receipt to the buyer 110 confirming the final settlement; and storing in the final OBP price and settlement database the final settlement status 253.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be coded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims. For example, the buyer or the system on behalf of buyer may be able to select more than one attribute. It is understood that a number of programming database applications may be accommodated by the present inventions. Other computer architectures, configurations, data processing methods and systems for displaying the contents (GUI), determining buyer selections and seller preferences/settings, and calculating the low, high, and final prices may be employed, the foregoing being for purpose of illustration and not limitation. Other forms of debit/credit transactions implementing the invention system sales and settlement are suitable.

What is claimed is:

1. A computer-implemented system for pricing and selling goods or services, comprising:

a controller having a computer processor configured to;

display a plurality of user-selectable goods and services via a graphical user interface;

in response to a user selection of the selected good or service from the plurality of user-selectable goods or services, generate a presentation of a list of attributes having the potential to be characteristic of a selected good or service, the presentation displayed on the graphical user interface;

in response to a user selection of the selected attribute from the plurality of user-selectable attributes, generate a presentation of a low price for the selected good or service corresponding to a negative occurrence of a selected attribute having a potential to be characteristic of a selected good or service and a high price for the selected good or service corresponding to a positive occurrence of the selected attribute having a potential to be characteristic of a selected good or service;

and generate a presentation provided of a final price for the selected good or service determined as a function of occurrence of the selected attribute, the low price, and the high price, the presentation displayed on the graphical user interface.

2. The system of claim 1, further comprising a presentation displayed on the graphical user interface of a standard price for each of the plurality of user-selectable goods and services and a user-selectable option to select an outcome based pricing option.

3. The system of claim 1, wherein the user-selectable goods and services comprise tickets to events.

4. The system of claim 1, further wherein the high price is determined as a function of adding a premium to a standard price and the low price is determined as a function of a discount applied to the standard price.

5. The system of claim 4, wherein the premium and the discount are determined as a function of a seller-defined mathematical relationship between the standard price, the premium, and the discount.

6. The system of claim 4, wherein the premium and the discount are set by a seller.

7. The system of claim 6, wherein the seller fixes the value for the discount as a result of which the premium is solved for automatically using a formula or formulae and the high price by adding the premium to the standard price and low price are determined by subtracting the discount from the standard price.

8. The system of claim 6, wherein the seller fixes the value for the premium as a result of which the discount is solved for automatically using a formula or formulae and the high price is determined by adding the premium to the standard price and the low price is determined by subtracting the discount from the standard price.

9. The system of claim 6, wherein in the seller fixes multiple values for the discount resulting in multiple spreads resulting in multiple pricing options to a buyer-user.

10. The system of claim 6, wherein the seller fixes multiple values for the premium resulting in multiple spreads resulting in multiple pricing options to a buyer-user.

11. The system of claim 4, wherein the premium and the discount are set by a buyer.

12. The system of claim 11, wherein the buyer fixes the value for the discount as a result of which the premium is solved for automatically using a formula or formulae and the high price is determined by adding the premium to the standard price and the low price is determined by subtracting the discount from the standard price.

13. The system of claim 11, wherein the buyer fixes the value for the premium as a result of which the discount is solved for automatically using a formula or formulae and the high price is determined by adding the premium to the standard price and the low price is determined by subtracting the discount from the standard price.

14. The system of claim 11, wherein the buyer fixes multiple values for the discount resulting in multiple Spreads resulting in multiple pricing options to the buyer.

15. The system of claim 11, wherein the buyer may identify an Attribute other than from the list provided.

16. The system of claim 11, wherein the buyer may simultaneously select multiple Selected Attributes.

17. The system of claim 11, wherein in the buyer fixes multiple values for the premium resulting in multiple Spreads resulting in multiple pricing options to the buyer.

18. The system of claim 1, wherein a seller can establish the high price and low price in such a way that an expected deviation from a standard price over a statistically significant sample set can be controlled by a seller.

19. A system for pricing and selling goods, including tickets to certain events, and services, the system comprising: a controller having a computer processor; a display configured to display via a graphical user interface a variety of goods or services, from which a buyer-user may select;

wherein in response to the buyer-user selecting goods, the apparatus is configured to display a list of attributes for the buyer-user to select from, each listed attribute ~i having a potential to be characteristic of selected goods or services; in response to the buyer-user selecting one or more of the listed attributes, the apparatus configured to generate and present two prices for the selected goods or services including (a) a low price corresponding to a negative occurrence of the selected attribute, which is the price if the selected attribute does not occur, and (b) a high price corresponding to a positive occurrence of the selected attribute, which is the price if the selected attribute does occur.

20. The system of claim 19, wherein the controller is configured to provide a standard price for the goods including services and an option for the buyer-user to select an outcome based pricing option.

21. The system of claim 19, wherein the selection of goods or services comprises tickets to events.

22. The system of claim 19, further configured to provide the high price as a function of adding a premium to a standard price and to provide the low price as a function of a discount applied to the standard price.

23. The system of claim 22, further configured in such a way as to enable the premium and the discount to be set by a seller.

24. The system of claim 22, further configured in such a way that the premium and the discount are determined as a function of a seller-defined mathematical relationship between the standard price, the premium, and the discount.

* * * * *